(12) United States Patent
Zhang et al.

(10) Patent No.: US 7,684,927 B2
(45) Date of Patent: Mar. 23, 2010

(54) SYSTEM AND METHOD FOR PERFORMING DISTRIBUTED SEQUENTIAL NODE LOCALIZATION IN ACTIVE SENSOR DEPLOYMENT

(75) Inventors: Ying Zhang, Cupertino, CA (US);
Qingfeng Huang, San Jose, CA (US);
Julia Liu, Milpitas, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1124 days.

(21) Appl. No.: 11/318,184

(22) Filed: Dec. 23, 2005

(65) Prior Publication Data

US 2007/0150176 A1 Jun. 28, 2007

(51) Int. Cl.
*G01C 21/00* (2006.01)
(52) U.S. Cl. .................. 701/201; 342/450; 342/457
(58) Field of Classification Search .................. 701/201
See application file for complete search history.

(56) References Cited

U.S. PATENT DOCUMENTS

| | | | | |
|---|---|---|---|---|
| 5,349,352 | A * | 9/1994 | Saleh | 341/143 |
| 6,502,175 | B1 * | 12/2002 | Krishnan et al. | 711/170 |
| 2002/0188527 | A1 * | 12/2002 | Dillard et al. | 705/27 |
| 2005/0151960 | A1 * | 7/2005 | Gerwe et al. | 356/121 |
| 2005/0197136 | A1 * | 9/2005 | Friday et al. | 455/456.1 |
| 2006/0007001 | A1 * | 1/2006 | Rastegar et al. | 340/552 |
| 2006/0149475 | A1 * | 7/2006 | Kellum et al. | 701/300 |

OTHER PUBLICATIONS

Y. Shang et al., "Localization From Connectivity in Sensor Networks," IEEE Trans. on Para. and Distr. Sys., V. 15 (10) (Oct. 2004).
P. Biswas et al., "Semidefinate Programming for Ad Hoc Wireless Sensor Network Localization," ACM/Conf. Info. Proc. in Sensor Nets. (2004).
K. Whitehouse, "Calamari: A Localization System For Sensor Networks," http://webs.cs.berkeley.edu/~kamin/localization.html (2003).
A. Savvides et al., "Dynamic Fine-Grained Localization in Ad-Hoc Networks of Sensors," Proc. of the 7th Annual ACM/IEEE Int'l Conf. on Mobile Comp. and Net., pp. 166-179 (2001).

(Continued)

*Primary Examiner*—Khoi Tran
*Assistant Examiner*—Rodney King
(74) *Attorney, Agent, or Firm*—Patrick J. S. Inouye; Scott E. Smith (57) ABSTRACT

A system and method for performing distributed sequential node localization in active sensor deployment is presented. An equilateral orthogonal reference frame is defined. The reference frame includes s+1 anchor nodes that is placed in s-dimensional physical space. New nodes are sequentially placed in a natural sequential ordering within the s-dimensional physical space to form a sequentially well-connected network. For each of the new nodes, location estimates are obtained for the new node from at least s+1 of the anchor nodes previously placed in the s-dimensional physical space. A location is determined for the new node based on the location estimates. The new node are placed in the s-dimensional physical space as a new anchor node proximate to at least one of the s+1 previously-placed anchor nodes upon satisfactory location determination.

24 Claims, 5 Drawing Sheets

OTHER PUBLICATIONS

T.C. Liang et al., "A Subgradient-Based Rounding Technique for the Semidefinite Programmable Relaxation in Solving Ad Hoc Wireless Sensor Network Localization Problems," Tech. Report, Stanford Univ., Dept. of Mgmt. Sci. and Engr. Sch. of Engr. (Jul. 2004).

Y. Zhang et al., "Sequential Localization in Active Department," Palo Alto Research Center, 2005.

* cited by examiner

SYSTEM AND METHOD FOR PERFORMING DISTRIBUTED SEQUENTIAL NODE LOCALIZATION IN ACTIVE SENSOR DEPLOYMENT

The U.S. Government has a paid-up license in this invention and the right in limited circumstances to require the patent owner to license others on reasonable terms as provided by the terms of Contract No. F33615-01-C-1904 awarded by ARPA/Airforce.

FIELD

This application relates in general to active sensor deployment and, in particular, to a system and method for performing distributed sequential node localization in active sensor deployment.

BACKGROUND

Localization is the process of determining or marking the location of objects or places of interest within a physical environment in two or three dimensions. Frequently, the environment is uncharted, remote, or inaccessible to conventional measuring techniques. Knowing the locations of objects or places can assist navigation or object retrieval or placement. For example, in a search and rescue scenario, the locations of victims or hazardous conditions should first be established to protect rescue personnel who must enter a disaster area.

Locations are marked relative to a stationary point of reference located either within or outside of the environment. Performing localization based on an external point of reference, such as through Global Positioning System (GPS) spatial coordinates, is trivial. Nevertheless, the external reference points must be accessible from each location within the environment, which can be infeasible if the external reference points are obstructed or are otherwise unavailable, such as occurs, for instance, indoors or underground, where GPS signals are blocked.

Performing localization relative to multiple distributed reference points within the environment can avoid the shortcomings of external reference points. To determine the relative location of a new point, the positions of known local reference points are measured and evaluated to form a location estimate. Distributed localization, though, is susceptible to noise, which can cause ranging errors in position and distance. Distributed localization is particularly difficult if the terrain of the environment is unpredictable or unknown and unexpected obstructions interfere with or decrease the accuracy of local reference points. Moreover, ranging errors have a tendency to propagate and be amplified through successive measurements. Several forms of distributed localization exist.

Multi-dimensional scaling (MDS) is one form of distributed localization that transforms proximity data into a geometric embedding, such as described in Y. Sheng et al., "Localization From Connectivity in Sensor Networks," IEEE Trans. on Para. and Distr. Sys., V. 15 (10) (October 2004), the disclosure of which is incorporated by reference. MDS-based localization computes the shortest path distance between all pairs of nodes, applies multi-dimensional scaling to a distance matrix, and transforms a relative map into an absolute map using known positions of anchor nodes. While MDS-based localization has a high success rate for connected networks, errors can be large if the network has high dilation.

Semidefinite programming (SDP) is another form of distributed localization that transforms a minimization problem into a semidefinite programming problem, such as described in P. Biswas, "Semidefinite Programming for Ad Hoc Wireless Sensor Network Localization," ACM/Conf. Info. Proc. in Sensor Nets. (2004), the disclosure of which is incorporated by reference. The environment must exhibit a uniquely localizability property. However, the property will not be satisfied if the network has fewer anchor nodes or connections than necessary or the ranging data exhibits large noise errors.

The incremental least squares (ILS) algorithm is yet another form of distributed localization that uses an error registry to choose neighboring nodes with locations favorable in terms of noise and error propagation model, such as described in F. Zhao, "Incremental Node Localization With Error Propagation Control In Ad Hoc Networks," Tech. Report P200310265, Xerox PARC (2004), the disclosure of which is incorporated by reference. The propagation model is used to generate a self-location estimate using multilateration. However, the approach requires at least s+1 known neighboring locations, where s is 2 or 3, and sufficient knowledge of error characteristics to enable the localization estimation to converge over successive iterations.

The shortest path approximation (SPA) is a form of distributed localization that computes the shortest paths from any node to anchor nodes and uses the path distances to approximate Euclidean distances, such described in K. Whitehouse, "Calamari: a Localization System For Sensor Networks," available at http://www.cs.berkley.edu/kamin/calamari (2003), the disclosure of which is incorporated by reference. The unknown node locations are computed using multilateration, given anchor node distances. However, SPA-based localization introduces large errors if the network exhibits high dilation or low connectivity.

Therefore, there is a need for an approach to determining the relative position of objects or places within an environment without reliance on pre-existing fixed points of reference. Preferably, such an approach would be able to decrease ranging error propagation by dynamically deploying points of reference within the environment while minimizing any resulting error conditions.

SUMMARY

One embodiment provides a system and method for performing distributed sequential node localization in active sensor deployment. An equilateral orthogonal reference frame is defined. The reference frame includes s+1 anchor nodes that is placed in s-dimensional physical space. New nodes are sequentially placed in a natural sequential ordering within the s-dimensional physical space to form a sequentially well-connected network. For each of the new nodes, location estimates are obtained for the new node from at least s+1 of the anchor nodes previously placed in the s-dimensional physical space. A location is determined for the new node based on the location estimates. The new node are placed in the s-dimensional physical space as a new anchor node proximate to at least one of the s+1 previously-placed anchor nodes upon satisfactory location determination.

A further embodiment provides a system and method for performing distributed sequential node localization in active sensor deployment using simple sequential multilateration. A reference frame is defined. The reference frame includes s+1 anchor nodes with s of the anchor nodes orthogonal to and at a known distance from a root anchor node. The reference frame is placed in an s-dimensional physical space. New nodes are sequentially added in a natural sequential ordering into the s-dimensional physical space to form a sequentially well-connected network. For each of the new nodes, location estimates are requested from the anchor nodes previously placed in the s-dimensional physical space. The location estimates are obtained from at least s+1 of the previously-placed anchor nodes. A location for the new node is determined based on the location estimates by performing simple sequential multilateration. The new node are placed in the s-dimensional physical space as a new anchor node proximate to at least one of the s+1 previously-placed anchor nodes upon achieving satisfactory results through the simple sequential multilateration.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Components

Figure 1:
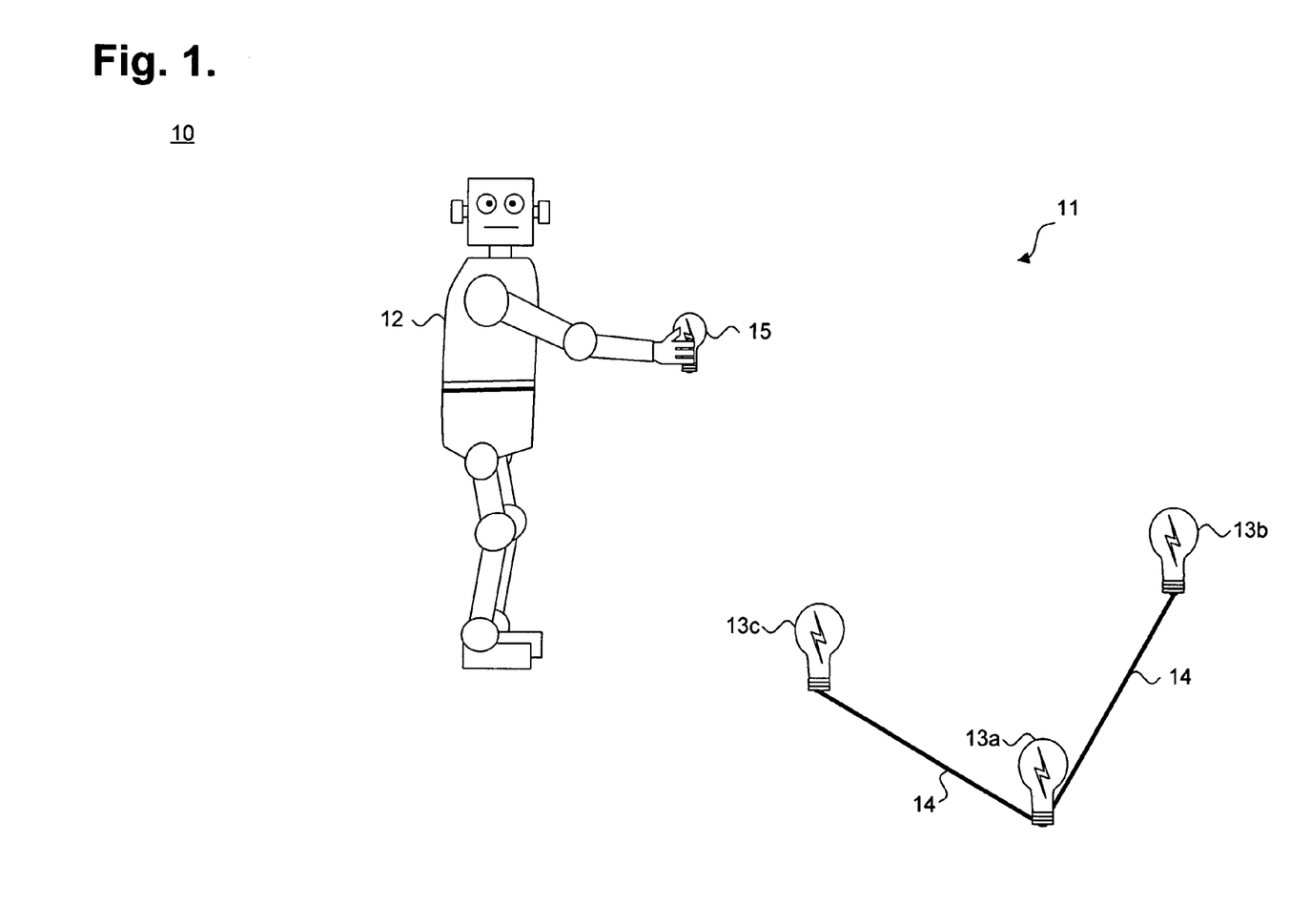
FIG. 1 is a block diagram showing, by way of example, components for performing distributed sequential node localization in active sensor deployment, in accordance with one embodiment.

Active sensors, or nodes, are sequentially deployed by a mobile effector, or robot, into a physical environment to determine or mark the location of objects or places of interest in two or three dimensions. FIG. 1 is a block diagram showing, by way of example, components 10 for performing distributed sequential node localization in active sensor deployment, in accordance with one embodiment. The nodes track the location of the robot and monitor the environment over time. No pre-existing points of reference, either within or external to the environment, are available to assist with node localization and anchor nodes are not uniformly distributed.

Distributed sequential node localization is performed by initially placing an orthogonal reference frame 14 having s+1 nodes 13a-c into an environment 11, where s is 2 or 3. The nodes 13a-c and. reference frame 14 can be placed by a mobile robot 12 that can move about the environment 11. The reference frame 14 is equilateral with the outer anchor nodes 13b, 13c situated at fixed distances from the root anchor node 13a located at the reference frame's vertex, as further described below with reference to FIG. 2. The mobile robot 12 carries additional nodes, which are dynamically placed sequentially into the environment 11, one-at-a-time. The sequential placement naturally forms a sequential ordering of the nodes, beginning with the root node 13a. Each new deployed node 15 is localized by the mobile robot 12 upon placement, as further described below with reference to FIGS. 3-5, and becomes an anchor node. As the location of each additional deployed node is determined, data screening and filtering are applied to raw sensor data and location results are locally refined to minimize error propagation during successive node placement.

In one embodiment, the nodes are implemented using Berkeley motes, such as described in "Berkeley Wireless Embedded Systems," available at http://webs.cs.berkeley.edu (2003), the disclosure of which is incorporated by reference. Each mote has an augmented ultrasound board and time of flight distance measurements. The mobile robot 12 includes a power source, telemetry interface to interface to the nodes, motive power and a self-contained guidance system to move and guide the mobile robot 12 about the environment 11, a node placement tool to physically place nodes into the environment 11, and an interface to a processor that can be implemented as an embedded micro programmed system or as a general-purpose portable computer system, such as a notebook computer. The processor is a programmable computing device that executes software programs and includes, for example, a central processing unit (CPU), memory, network interface, persistent storage, and various components for interconnecting these components. Other node and robot structures and components are possible.

Active Sensor Deployment Example

The nodes are actively deployed by the mobile robot to form a sequentially well-connected network, which is defined as follows. Given a sequential ordering of nodes located in s-dimensional space, where s is 2 or 3, a node is sequentially well-connected if the node connects to at least s+1 nodes in the lower order of the sequence of nodes. A network is sequentially well-connected if all non-anchor nodes are sequentially well-connected, where all anchor nodes have the lowest order in the sequence of nodes.

All nodes are self-localized with reference to an orthogonal reference frame. FIGS. 2-5 are line diagrams showing, by way of example, an active sensor deployment in a representation of a two-dimensional physical space 20. For ease of discussion, distributed sequential node localization is described with reference to two dimensional space, but applies equally to three dimensional space mutatis mutandis.

Figure 2:
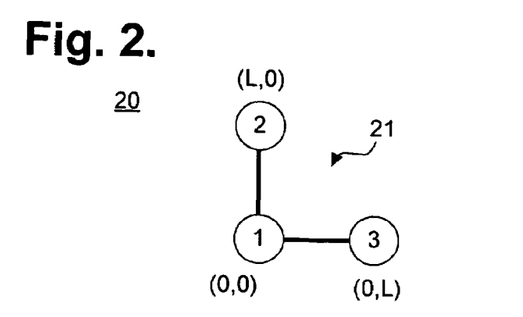
FIGS. 2-5 are line diagrams showing, by way of example, an active sensor deployment in a representation of a two-dimensional physical space.

Referring first to FIG. 2, all nodes are self-localized with reference to an orthogonal reference frame 21. The reference frame 21 has sides of length L, with s+1 nodes mounted at points $(0, 0)$, $(0, L)$, and $(L, 0)$, where s is 2. The original s+1 nodes on the reference frame 21 form an initial set of anchor nodes and sequential node localization can proceed once the reference frame 21 has been placed into the physical space 20 by the mobile robot.

Figure 3:
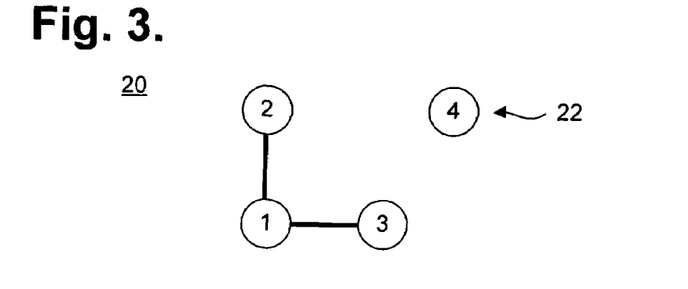

Referring next to FIG. 3, the mobile robot places each additional node 22 into the physical space 20 one-at-a-time. The mobile robot moves to within a predefined distance to the location of a previously-placed node and transmits an ultrasound signal. Those previously-placed nodes that receive the ultrasound signal respond by transmitting sensor data that includes a distance measure and its own location. If the mobile robot has received at least s+1 responses, the additional node can be placed. Otherwise, the mobile robot will move to another location and reattempt node placement.

Each placed node is localized through simple sequential multilateration, such as described in A. Savvides et al., "Dynamic Fine-Grained Localization in Ad-Hoc Networks of Sensors," Proc. of the 7th Annual ACM/IEEE Int'l Conf. on Mobile Comp. and Net., pp. 166-179 (2001), the disclosure of which is incorporated by reference. Simple sequential multilateration estimates the placed node's location using the distances to a set of anchor nodes, as further described below with reference to FIG. 8. Once placed, each node becomes an anchor node.

Figure 4:
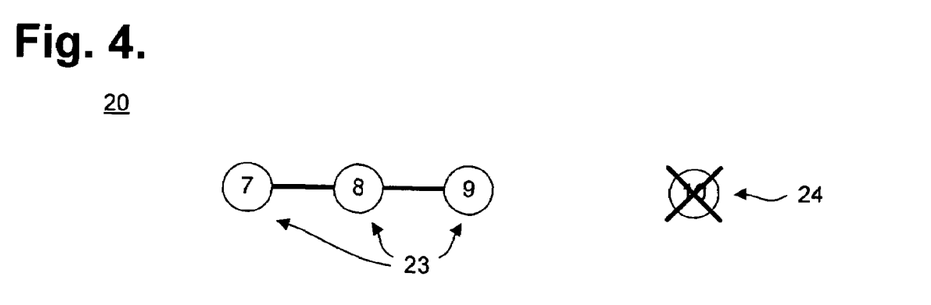
Figure 5:
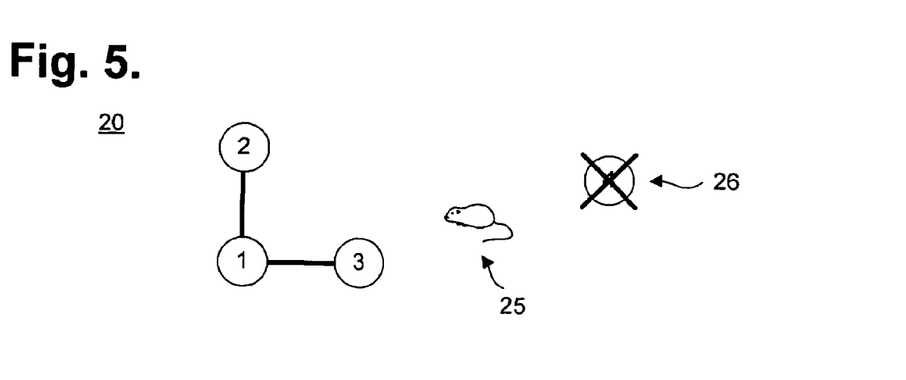

Referring next to FIGS. 4 and 5, simple sequential multilateration can fail in two situations. First, the geometry of sensor placement must enable the location of the each new node to be determined. If the anchor nodes are located in collinear orientations 23 for a two-dimensional space, and in coplanar orientations (not shown) for a three-dimensional space, the location of the node will not be determinable and node placement will fail 24. A collinear orientation could occur, for instance, where each of the s+1 responding. nodes were placed along the same line. Second, errors in ranging data 25, such as caused by noise or interference, can adversely affect the distance estimation and node placement will also fail 26.

Method

Figure 6:
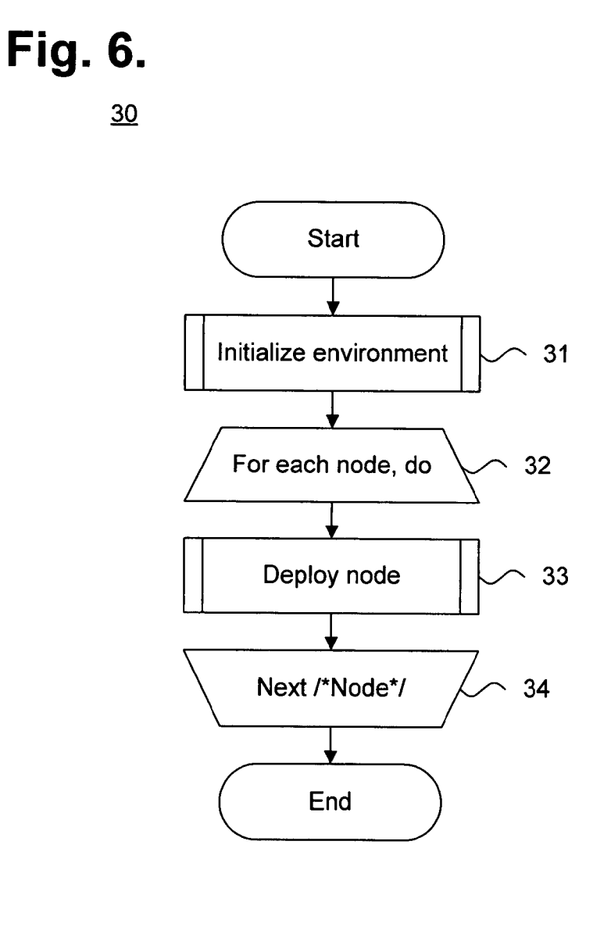
FIG. 6 is a flow diagram showing a method for performing distributed sequential node localization in active sensor deployment, in accordance with one embodiment.

Distributed sequential node localization is performed after each new node is placed into the environment. FIG. 6 is a flow diagram showing a method 30 for performing distributed sequential node localization in active sensor deployment, in accordance with one embodiment. The method 30 is provided as a sequence of process steps or operations that are performed, for example, by a mobile robot in communication with sensor-equipped nodes previously-placed into a physical space.

Figure 7:
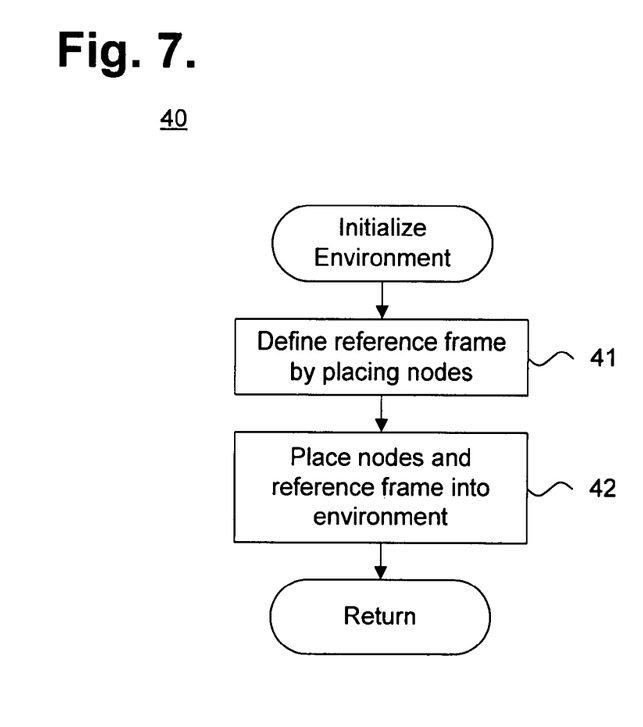
FIG. 7 is a flow diagram showing a routine for initializing an environment for use in the method of FIG. 6.

The environment 11 is first initialized to define and place an orthogonal reference frame 14 (block 31), as further described below with reference to FIG. 7. Each new node 15 that is to be placed into the environment 11 (block 32) is deployed (block 33), as further described below with reference to FIG. 8. The method terminates upon the placement of the last additional node (block 34).

Environment Initialization

The orthogonal reference frame enables the nodes to be self-localized. FIG. 7 is a flow diagram showing a routine 40 for initializing an environment for use in the method 30 of FIG. 6. The reference frame 14 is first defined by placing nodes 13a-c on the reference frame 14 (block 41). For a two-dimensional space, the reference frame 14 includes three nodes 13a-c, which are placed at a fixed distance L in locations (0, 0), (L, 0), and (0, L), which naturally forms a sequential ordering of the nodes, beginning with the root node 13a located at location (0, 0). Finally, the placed nodes 13a-c and reference 14 are placed into the environment 11 by the mobile robot 12 (block 42).

Node Deployment

Figure 8:
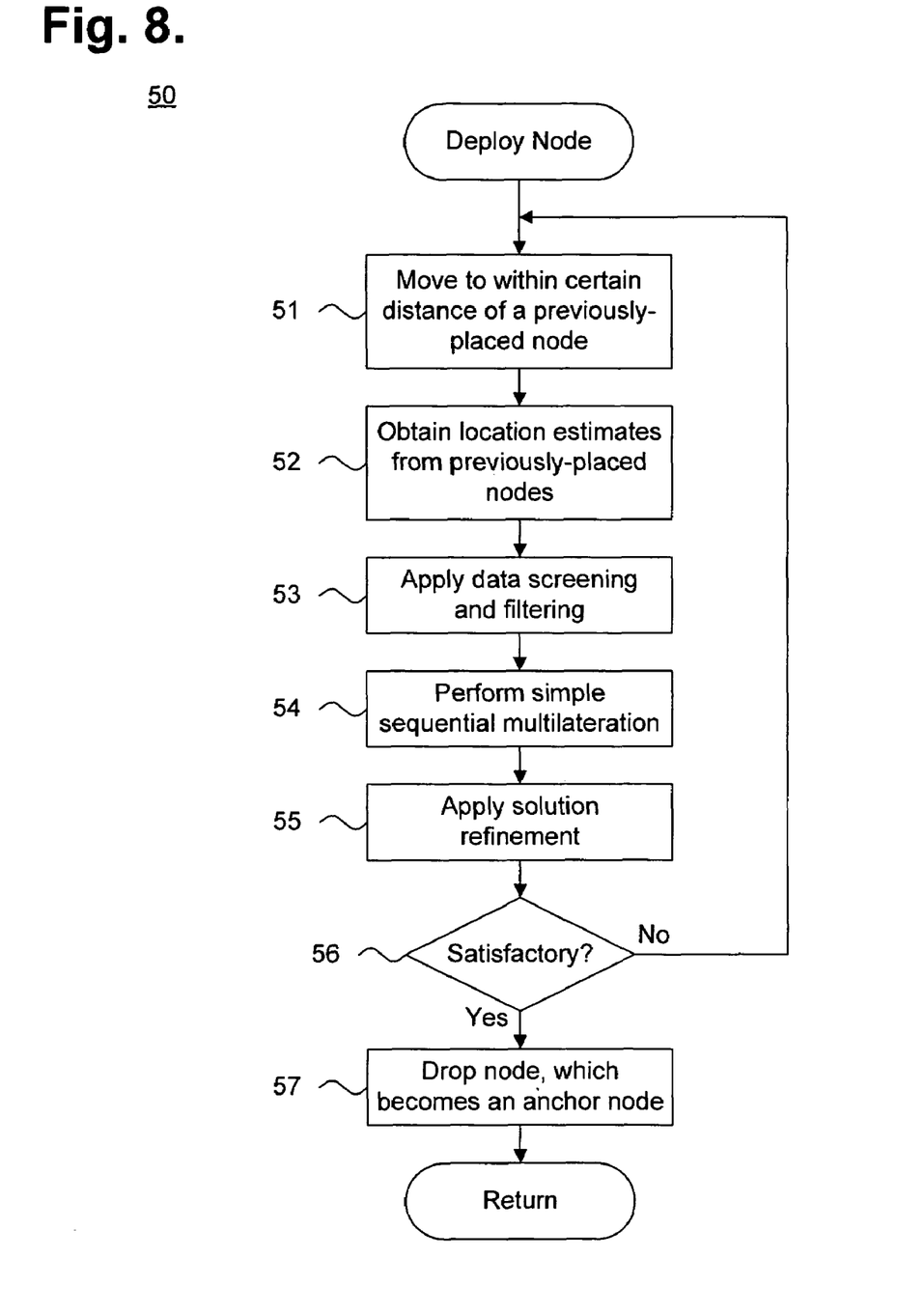
FIG. 8 is a flow diagram showing a routine for deploying a node for use in the method of FIG. 6.

Each additional node is dynamically placed into the environment and localized. FIG. 8 is a flow diagram showing a routine 50 for deploying a node for use in the method 30 of FIG. 6. The mobile robot 12 first moves to within a certain distance of at least one of the nodes 13a-c previously placed in the environment 11 (block 51). The distance limitation helps to minimize ranging errors caused, for instance, by noise or interference. Location estimates are then obtained from the previously-placed nodes 13a-c (block 52) by sending a ultrasound request and receiving responses. At least s+1 of the previously-placed nodes 13a-c must respond. The raw sensor data is then screened and filtered (block 53), simple sequential multilateration is performed to determine the location of the to-be-placed node (block 54), and solution refinement is applied (block 55), as further described below. If the location results are satisfactory (block 56), the node is placed and becomes an anchor node (block 57).

In one embodiment, simple sequential multilateration is performed as follows. Given a node located at x and m anchor nodes with known position $x_1, \ldots, x_m$ and distances $d_1, \ldots d_m$ to the node, multilateration can be derived from the quadratic equation $|x-x_i|^2=d_i^2$, that is, $|x|^2+|x_i|^2-2x_i^T x=d_i^2$. From m such quadratic constraints, m−1 linear constraints can be derived by subtracting the constraint i=m to obtain the equation:

$$-2(x_i-x_m)^T x=(d_i^2-d_m^2)-(|x_i|^2-|x_m|^2) \quad (1)$$

By letting $a_i=-2(x_i-x_m)$ and $b_i=(d_i^2-d_m^2)-(|x_i|^2-|x_m|^2)$, equation (1) can be simplified to $a_i^T x=b_i$, where $a_i$ is an s×1 vector for s-dimensional spaces and $b_i$ is a single scalar. The resulting m−1 linear constraints can be expressed in matrix form as the equation:

$$Ax=b \quad (2)$$

where $A=(a_1, a_2, \ldots, a_{m-1})^T$ and $b=(b_1, b_2, \ldots b_{m-1})^T$. Multilateration is the least squares solution to equation (2), which results in the equation:

$$\hat{x}=(A^T A)^{-1} A^T b \quad (3)$$

where $\hat{x}$ is an estimate of location x. Equation (3) can be readily determined, since $A^T A$ is an s x s matrix, where s is either 2 or 3.

Equation (3) also indicates that the geometry of sensor placement and the signal quality of sensor measurements can affect the error in the location estimate $\hat{x}$. For example, if all anchor nodes are collinear or there are less than s+1 anchor nodes, the anchor nodes cannot be used to uniquely determine location x. The estimation error is upper bounded per the equation:

$$\frac{|\Delta \hat{x}|}{|\hat{x}|} \leq c(A) \frac{|\Delta b|}{|b|} \quad (4)$$

where c(·) is the condition number. If the measure $d_i$ has noise $|\Delta b|>0$, then a large c(A) can cause a large $|\Delta x|$. The matrix A is spanned by the displacement vectors $(x_i-x_m)$, which are row vectors. For collinear nodes or a number of anchor nodes less than s+1, A is singular and c(A)=∞. Thus, even the slightest perturbation in sensor measurements will be amplified unboundedly. In contrast, a well-distributed sensor layout will produce a well-conditioned matrix A with c(A) being small.

In active node deployment, the placement of each subsequent new node 15 can be controlled. Therefore, in addition to waiting for at least s+1 responses from the previously-placed nodes, the condition of matrix A, which is derived from the positions of the anchor nodes only, can also be checked as a boundary condition. Accordingly, the mobile robot 12 will drop the next new node 15 only if c(A)<C . In one embodiment, C is constant value. In further embodiments, C can be set to a data noise cutoff level or set adaptively based on localization results.

Data screening and filtering are performed as preprocessing before localization to filter out bad sensor data. Two forms of preprocessing are used, although other forms of preprocessing are possible:

(1) Symmetric Enforcement: in most cases, $d_{ij}$ is not the same as $d_{ji}$. On the assumption that the larger measurement is the result of an indirect path, such as caused by a signal reflection, min($d_{ij}$, $d_{ji}$) is taken to be the value for the distance between nodes i and j. Where only one measurement exists, the value of the single measurement is used for both $d_{ij}$ and $d_{ji}$.

(2) Triangular Enforcement: given any two points i and j in space, $d_{ij} \leq d_{ik} + d_{kj}$ should hold for any k, if both $d_{ik}$ and $d_{kj}$ exist. If $d_{ij} > d_{ik} + d_{kj} + \epsilon$, where $\epsilon$ is a small number related to noise levels of ranging data, and nodes i and j have at least three other connections, the connection between nodes i and j is ignored to avoid allowing bad sensor data to contaminate the localization results.

Solution refinement is performed as post processing following localization to improve the quality of the location results. Two forms of post processing are used, although other forms of post processing are possible:

(1) Least-Square Refinement: For any node i, the equation $\min_{x_i} \Sigma_j (|x_i - x_j| - d_{ij})^2$, is minimized, where $x_j$ are estimated neighbor locations. The equation can be solved iteratively using Newton's method, using the current estimate for xi as an initial value. The solution can suffer from singularities when under-constrained.

(2) Subgradient Refinement: Subgradient refinement, such as described in T. C. Liang et al., "A Subgradient-Based Refinement Technique for Semidefinite Programming Relaxation in Solving Ad Hoc Wireless Sensor Networks," Tech. Report, Stanford. Univ., Dept. of Mgmt. Sci. and Engr. Sch. Of Engr. (July 2004), the disclosure of which is incorporated by reference, works well in under-constrained situations. Subgradient refinement solves the equation:

$$x_i^{k+1} \leftarrow x_i^k - \gamma \frac{\partial s}{\partial x_i} \quad (5)$$

where s is a stress function. Two forms of stress functions are used, although other forms of stress functions are possible:

$$s(X) = \frac{1}{2} \sum_j (|x_i - \hat{x}_j| - d_{ij})^2 \quad (6)$$

$$\frac{\partial s}{\partial x_i} = \sum_j (|x_i - x_j| - dij) \frac{(x_i - x_j)}{|x_i - x_j|} \quad (7)$$

and $$s(X) = \sum_j \text{abs}(|x_i - \hat{x}_j| - d_{ij}) \quad (8)$$

$$\frac{\partial s}{\partial x_i} = \sum_j \text{sign}(|x_i - x_j| - dij) \frac{(x_i - x_j)}{|x_i - x_j|} \quad (9)$$

Sequential Localizer

Figure 9:
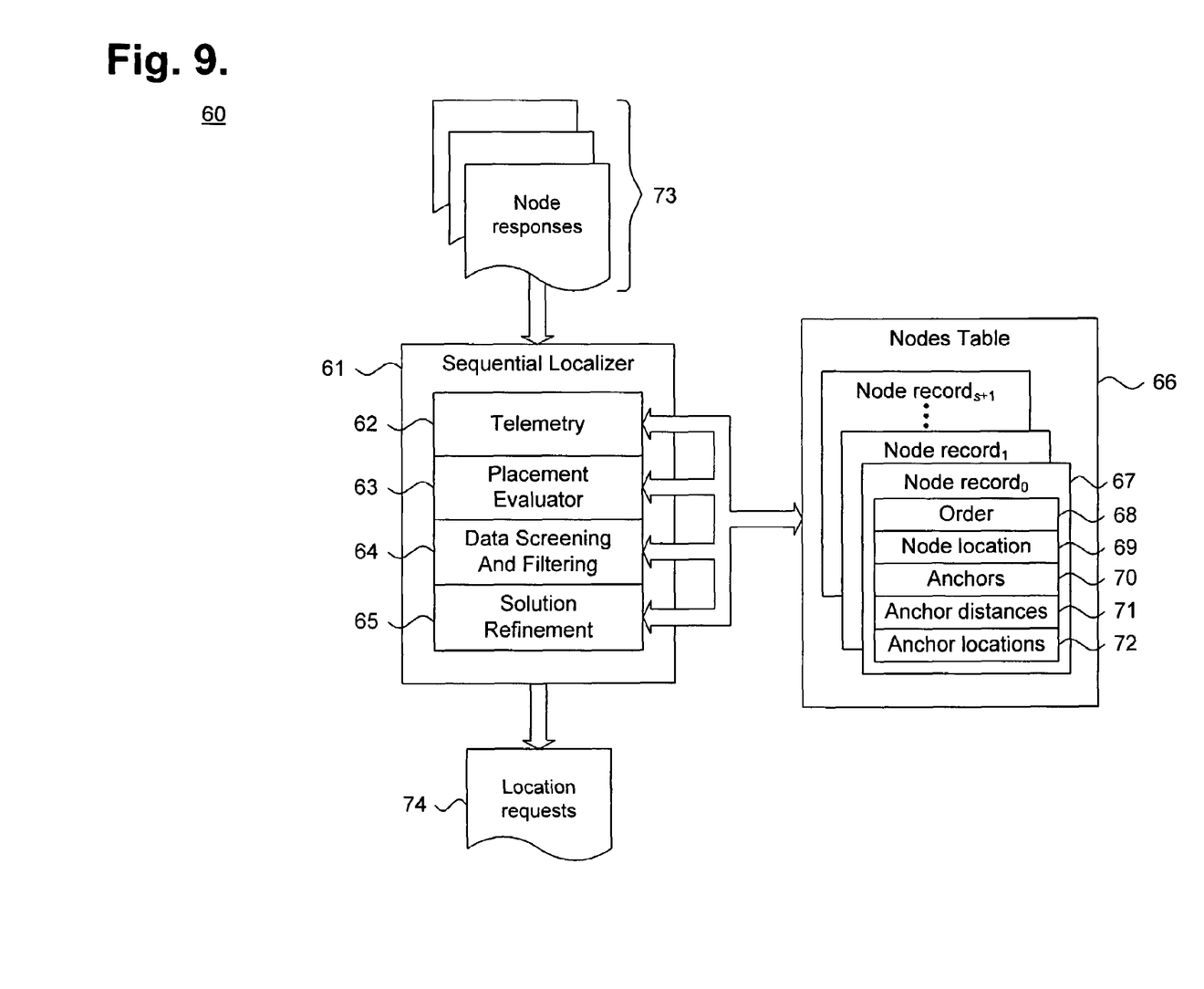
FIG. 9 is a functional block diagram showing a system for performing distributed sequential node localization in active sensor deployment, in accordance with one embodiment.

The sequential localizer can be a component separate from or integral to the mobile robot 12. The same functions are performed independent of physical location, provided sensor data from the previously-placed nodes is received and additional nodes are placed based on the localization performed on the sensor data. FIG. 9 is a functional block diagram showing a system 60 for performing distributed sequential node localization in active sensor deployment, in accordance with one embodiment. A sequential localizer 61 includes a set of functional modules 62-65 and a nodes table 66 maintained, for instance, in persistent storage. Other processor components are possible.

The sequential localizer 61 tracks each placed node in the nodes table 66 and stores a node record 67 for each node. Each node record 67 includes the order in the sequence of placed nodes assigned 68, the location of the node 69, the orders of the anchor nodes 70, and their distances 71 and locations 72. Other types of node data are possible.

The sequential localizer 61 includes a telemetry interface 62 for sending location requests 74, which are transmitted ultrasound signals, and for receiving responses 73 from previously-placed nodes. The modules for placement evaluator 63, data screening and filtering 64, and solution refinement 65 respectively perform simple sequential localization, data screening and filtering, and solution refinement, as further described above with reference to FIG. 8. Other processor modules are possible.

While the invention has been particularly shown and described as referenced to the embodiments thereof, those skilled in the art will understand that the foregoing and other changes in form and detail may be made therein without departing from the spirit and scope.

What is claimed is:

1. A system for performing distributed sequential node localization in active sensor deployment, comprising:
    an equilateral orthogonal reference frame comprising s+1 anchor nodes that is placed in unreferenced s-dimensional physical space, wherein the s+1 anchor nodes comprise s outer anchor nodes situated at fixed distances from a root anchor node located at the vertex of the reference frame; and
    a mobile effector to sequentially place new nodes in a natural sequential ordering within the s-dimensional physical space to form a sequentially well-connected network, wherein each of the new nodes is connected to at least s+1 of previously placed nodes, comprising:
        a mobility unit to move within a predefined distance to the location of one of the previously placed nodes;
        a telemetry interface to transmit ultrasonic signals to the previously placed nodes when at the predefined distance and to obtain ultrasonic signal responses comprising location estimates for the new node from the anchor nodes previously placed in the s-dimensional physical space; and
        a placement evaluator to determine a location for the new node based on the location estimates, wherein the new node is placed in the s-dimensional physical space as a new anchor node proximate to at least one of the s+1 previously-placed anchor nodes upon receipt of location estimates from at least s+1 anchor nodes and satisfactory location determination.

2. A system according to claim 1, further comprising:
    a data screen and filter to evaluate the geometry of the at least one of the s+1 previously-placed anchor nodes, and to check for collinear conditions and coplanar conditions with respect to the s+1 previously-placed anchor nodes and to remove the collinear conditions and coplanar conditions prior to placing the new node, where the s-dimensional physical space comprises a two-dimensional physical space.

3. A system according to claim 1, wherein errors in ranging data are minimized, comprising at least one of:
    a placement limiter to limit the placing of the new node to within a set range of the at least one of the s+1 previously-placed anchor nodes; and
    a solution refiner to refine the new node location.

4. A system according to claim 1, wherein the new node location is determined through simple sequential multilateration.

5. A system according to claim 4, wherein the simple sequential multilateration is performed in accordance with the equation:

$$\hat{x} = (A^T A)^{-1} A^T b$$

where $\hat{x}$ is an estimate of a location x for the new node, $A^T A$ is an s×s matrix, $A=(a_1, a_2, \ldots, a_{m-1})^T$, $b=(b_1, b_2, \ldots b_{m-1})^T$, $a_i$ is an s+1 vector for an s-dimensional space, $b_i$ is a single scalar, and m is the set of anchor nodes.

6. A system according to claim 1, further comprising:
a preprocessor to perform at least one of:
applying symmetric enforcement to the location estimates between the new node and each of the s+1 previously-placed anchor nodes; and
determining triangular enforcement against each of the s+1 previously-placed anchor nodes.

7. A system according to claim 1, further comprising:
a post processor to perform at least one of:
performing least squares refinement on the determination of the new node location, wherein the placing of the new node is deferred to a different location in the s-dimensional physical space if the determination of the new node location is under-constrained; and
performing subgradient refinement on the results of the determination of the new node location, wherein the placing of the new node is deferred to a different location in the s-dimensional physical space if the determination of the new node location is exceeds a predefined stress function.

8. A system according to claim 1, further comprising:
a data filter to define a boundary condition c(A)<C, wherein C is selected from the group comprising a constant value, a data noise cutoff level, and an adaptive limit.

9. A method for performing distributed sequential node localization in active sensor deployment, comprising:
defining an equilateral orthogonal reference frame comprising s+1 anchor nodes that is placed in unreferenced s-dimensional physical space, wherein the s+1 anchor nodes comprise s outer anchor nodes situated at fixed distances from a root anchor node located at the vertex of the reference frame; and
sequentially placing new nodes in a natural sequential ordering within the s-dimensional physical space to form a sequentially well-connected network, wherein each of the new nodes is connected to at least s+1 of previously placed nodes, comprising:
moving within a predefined distance to the location of one of the previously placed nodes;
transmitting ultrasonic signals to the previously placed nodes when at the predefined distance;
obtaining ultrasonic signal responses comprising location estimates for the new node from the anchor nodes previously placed in the s-dimensional physical space and determining a location for the new node based on the location estimates; and
placing the new node in the s-dimensional physical space as a new anchor node proximate to at least one of the s+1 previously-placed anchor nodes upon receipt of location estimates from at least s+1 anchor nodes and satisfactory location determination.

10. A method according to claim 9, further comprising:
evaluating the geometry of the at least one of the s+1 previously-placed anchor nodes, comprising:
checking for collinear conditions with respect to the s+1 previously-placed anchor nodes and removing the collinear conditions prior to placing the new node, where the s-dimensional physical space comprises a two-dimensional physical space; and
checking for coplanar conditions with respect to the s+1 previously-placed anchor nodes and removing the coplanar conditions prior to placing the new node, where the s-dimensional physical space comprises a three-dimensional physical space.

11. A method according to claim 9, further comprising:
minimizing errors in ranging data, comprising at least one of:
limiting the placing of the new node to within a set range of the at least one of the s+1 previously-placed anchor nodes; and
refining the new node location.

12. A method according to claim 9, wherein the new node location is determined through simple sequential multilateration.

13. A method according to claim 12, further comprising:
performing simple sequential multilateration in accordance with the equation:

$$\hat{x} = (A^T A)^{-1} A^T b$$

where $\hat{x}$ is an estimate of a location x for the new node, $A^T A$ is an s×s matrix, $A=(a_1, a_2, \ldots, a_{m-1})^T$, $b=(b_1, b_2, \ldots b_{m-1})^T$, $a_i$ is an s×1 vector for an s-dimensional space, $b_i$ is a single scalar, and m is the set of anchor nodes.

14. A method according to claim 9, further comprising:
preprocessing the location estimates, comprising at least one of:
applying symmetric enforcement to the location estimates between the new node and each of the s+1 previously-placed anchor nodes; and
determining triangular enforcement against each of the s+1 previously-placed anchor nodes.

15. A method according to claim 9, further comprising:
post processing the new node location, comprising at least one of:
performing least squares refinement on the determination of the new node location and deferring the placing of the new node to a different location in the s-dimensional physical space if the determination of the new node location is under-constrained; and
performing subgradient refinement on the results of the determination of the new node location and deferring the placing of the new node to a different location in the s-dimensional physical space if the determination of the new node location is exceeds a predefined stress function.

16. A method according to claim 9, further comprising:
defining a boundary condition c(A)<C, wherein C is selected from the group comprising a constant value, a data noise cutoff level, and an adaptive limit.

17. A system for performing distributed sequential node localization in active sensor deployment using simple sequential multilateration, comprising:
a reference frame comprising s+1 anchor nodes with s of the anchor nodes orthogonal to and at a known distance from a root anchor node located at the vertex of the reference frame; and
a mobile effector, comprising:
a sequential localizer to sequentially add new nodes in a natural sequential ordering into unreferenced s-dimensional physical space to form a sequentially well-connected network, wherein each of the new nodes is connected to at least s+1 of previously placed nodes, comprising:

a mobility unit to move within a predefined distance to the location of one of the previously placed nodes;

a telemetry interface to request ultrasonic signals comprising location estimates for the new node from at least s+1 of the anchor nodes previously placed in the s-dimensional physical space when at the predefined distance; and a placement evaluator to determine a location for the new node based on the location estimates by performing simple sequential multilateration; and a placement tool to place the reference frame in an s-dimensional physical space and to place the new node in the s-dimensional physical space as a new anchor node proximate to at least one of the s+1 previously-placed anchor nodes upon receipt of the location estimates from the at least s+1 of the previously placed anchor nodes and achieving satisfactory results through the simple sequential multilateration.

18. A system according to claim 17, wherein the simple sequential multilateration is performed in accordance with the equation:

$$\hat{x}=(A^TA)^{-1}A^Tb$$

where $\hat{x}$ is an estimate of a location x for the new node, $A^TA$ is an s×s matrix, $A=(a_1, a_2, \ldots, a_{m-1})^T$, $b=(b_1, b_2, \ldots b_{m-1})^T$, $a_i$ is an s×1 vector for an s-dimensional space, $b_i$ is a single scalar, and m is the set of anchor nodes.

19. A system according to claim 17, further comprising:

a preprocessor to preprocess the location estimates, comprising at least one of:

applying symmetric enforcement to the location estimates between the new node and each of the s+1 previously-placed anchor nodes in accordance with the equation:

$$\min(d_{ij}, d_{ji})$$

where $d_{ij}$ is a distance between nodes i and j and $d_{ji}$ is a distance between nodes j and i; and determining triangular enforcement against each of the s+1 previously-placed anchor nodes in accordance with the equation:

$$d_{ij} \leq d_{ik}+d_{kj}$$

where $d_{ik}$ is a distance between nodes i and k and $d_{kj}$ is a distance between nodes k and j, for any k, if both $d_{ik}$ and $d_{kj}$ exist.

20. A system according to claim 17, further comprising:

a post processor to post process the location, comprising at least one of:

performing least squares refinement on the determination of the new node location in accordance with the equation:

$$\min_{x_i} \Sigma_j (|x_i-x_j|-d_{ij})^2$$

where, for any node i at location x, $x_i$ is minimized and $x_j$ are estimated neighbor locations, wherein the placing of the new node is deferred to a different location in the s-dimensional physical space if the determination of the new node location is under-constrained; and performing subgradient refinement on the results of the determination of the new node location in accordance with at least one of the equations:

$$s(X) = \frac{1}{2}\sum_j (|x_i - \hat{x}_j| - d_{ij})^2$$

$$\frac{\partial s}{\partial x_i} = \sum_j (|x_i - x_j| - dij)\frac{(x_i - x_j)}{|x_i - x_j|}$$

and $$s(X) = \sum_j \text{abs}(|x_i - \hat{x}_j| - d_{ij})$$

$$\frac{\partial s}{\partial x_i} = \sum_j \text{sign}(|x_i - x_j| - dij)\frac{(x_i - x_j)}{|x_i - x_j|}$$

where s is a stress function, wherein the placing of the new node is deferred to a different location in the s-dimensional physical space if the determination of the new node location is exceeds a predefined stress function.

21. A method for performing distributed sequential node localization in active sensor deployment using simple sequential multilateration, comprising:

defining a reference frame comprising s+1 anchor nodes with s of the anchor nodes orthogonal to and at a known distance from a root anchor node located at the vertex of the reference frame;

placing the reference frame in an unreferenced s-dimensional physical space; and sequentially adding new nodes in a natural sequential ordering into the s-dimensional physical space to form a sequentially well-connected network, for each of the new nodes, comprising:

moving within a predefined distance to the location of one of the previously placed nodes;

requesting ultrasonic signals comprising location estimates for the new node from at least s+1 of the anchor nodes previously placed in the s-dimensional physical space when at the predefined distance;

obtaining the location estimates from at least s+1 of the previously-placed anchor nodes;

determining a location for the new node based on the location estimates by performing simple sequential multilateration; and placing the new node in the s-dimensional physical space as a new anchor node proximate to at least one of the s+1 previously-placed anchor nodes upon receipt of the location estimates from the at least s+1 of the previously placed anchor nodes and achieving satisfactory results through the simple sequential multilateration.

22. A method according to claim 21, further comprising:

performing the simple sequential multilateration in accordance with the equation:

$$\hat{x}=(A^TA)^{-1}A^Tb$$

where $\hat{x}$ is an estimate of a location x for the new node, $A^TA$ is an s×s matrix, $A=(a_1, a_2, \ldots, a_{m-1})$, $b=(b_1, b_2, \ldots, b_{m-1})^T$, $a_i$ is an s×1 vector for an s-dimensional space, $b_i$ is a single scalar, and m is the set of anchor nodes.

23. A method according to claim 21, further comprising:

preprocessing the location estimates, comprising at least one of:

applying symmetric enforcement to the location estimates between the new node and each of the s+1 previously-placed anchor nodes in accordance with the equation:

$$\min(d_{ij}, d_{ji})$$

where $d_{ij}$ is a distance between nodes i and j and $d_{ji}$ is a distance between nodes j and i; and determining triangular enforcement against each of the s+1 previously-placed anchor nodes in accordance with the equation:

$$d_{ij} \leq d_{ik} + d_{kj}$$

where $d_{ik}$ is a distance between nodes i and k and $d_{kj}$ is a distance between nodes k and j, for any k, if both $d_{ik}$ and $d_{kj}$ exist.

24. A method according to claim 21, further comprising:
post processing the location, comprising at least one of:
performing least squares refinement on the determination of the new node location in accordance with the equation:

$$\min_{x_i} \Sigma_j (|x_i - x_j| - d_{ij})^2$$

where, for any node i at location x, $x_i$ is minimized and $x_j$ are estimated neighbor locations, wherein the placing of the new node is deferred to a different location in the s-dimensional physical space if the determination of the new node location is under-constrained; and performing subgradient refinement on the results of the determination of the new node location in accordance with at least one of the equations:

$$s(X) = \frac{1}{2}\sum_j (|x_i - \hat{x}_j| - d_{ij})^2$$

$$\frac{\partial s}{\partial x_i} = \sum_j (|x_i - x_j| - dij)\frac{(x_i - x_j)}{|x_i - x_j|}$$

and $$s(X) = \sum_j \text{abs}(|x_i - \hat{x}_j| - d_{ij})$$

$$\frac{\partial s}{\partial x_i} = \sum_j \text{sign}(|x_i - x_j| - dij)\frac{(x_i - x_j)}{|x_i - x_j|}$$

where s is a stress function, wherein the placing of the new node is deferred to a different location in the s-dimensional physical space if the determination of the new node location is exceeds a predefined stress function.

* * * * *

UNITED STATES PATENT AND TRADEMARK OFFICE
CERTIFICATE OF CORRECTION

PATENT NO. : 7,684,927 B2
APPLICATION NO. : 11/318184
DATED : March 23, 2010
INVENTOR(S) : Ying Zhang, Qingfeng Huang and Juan Liu It is certified that error appears in the above-identified patent and that said Letters Patent is hereby corrected as shown below:

Title Page, Item (75) Inventors should read:

-- Ying Zhang, Cupertino, CA (US);
Qingfeng Huang, San Jose, CA (US);
Juan Liu, Milpitas, CA (US) --

Signed and Sealed this
Sixth Day of September, 2011

David J. Kappos
*Director of the United States Patent and Trademark Office*